Jan. 1, 1935. R. C. LAMOND 1,986,640
STEERING MECHANISM
Filed Sept. 28, 1931 10 Sheets-Sheet 5

Jan. 1, 1935.  R. C. LAMOND  1,986,640
STEERING MECHANISM
Filed Sept. 28, 1931   10 Sheets-Sheet 6

Inventor:-
Robert C. Lamond
by his Attorneys
Howson & Howson

Jan. 1, 1935. R. C. LAMOND 1,986,640
STEERING MECHANISM
Filed Sept. 28, 1931 10 Sheets-Sheet 8

Inventor:-
Robert C. Lamond
by his Attorneys
Howson & Howson

Patented Jan. 1, 1935

1,986,640

UNITED STATES PATENT OFFICE 1,986,640

STEERING MECHANISM

Robert C. Lamond, Philadelphia, Pa., assignor to American Engineering Company, Philadelphia, Pa., a corporation of Pennsylvania Application September 28, 1931, Serial No. 565,644

21 Claims. (Cl. 60—52)

This invention relates to improvements in steering machines for marine vessels, and a principal object of the invention is to provide a machine of this character having generally improved operating characteristics.

Another object of the invention is to provide a steering machine of the type set forth which shall be materially more sensitive in control than machines made in accordance with the prior practice.

A more specific object of the invention is to provide a steering machine having a novel and generally improved control mechanism.

The invention further resides in the provision of a novel torque equalizing device which prevents development of unduly high pressures in the hydraulic system constituting a part of the mechanism.

Still another object of the invention is to provide in a hydraulic steering mechanism including alternative pumping units, novel means associated with the follow-up device for automatically maintaining the pilot motors in step, thereby facilitating the operation of shifting from one of the alternative pumping units to the other.

The invention further resides in certain novel details, both mechanical and structural, hereinafter set forth and illustrated in the attached drawings, in which.

Figure 1:
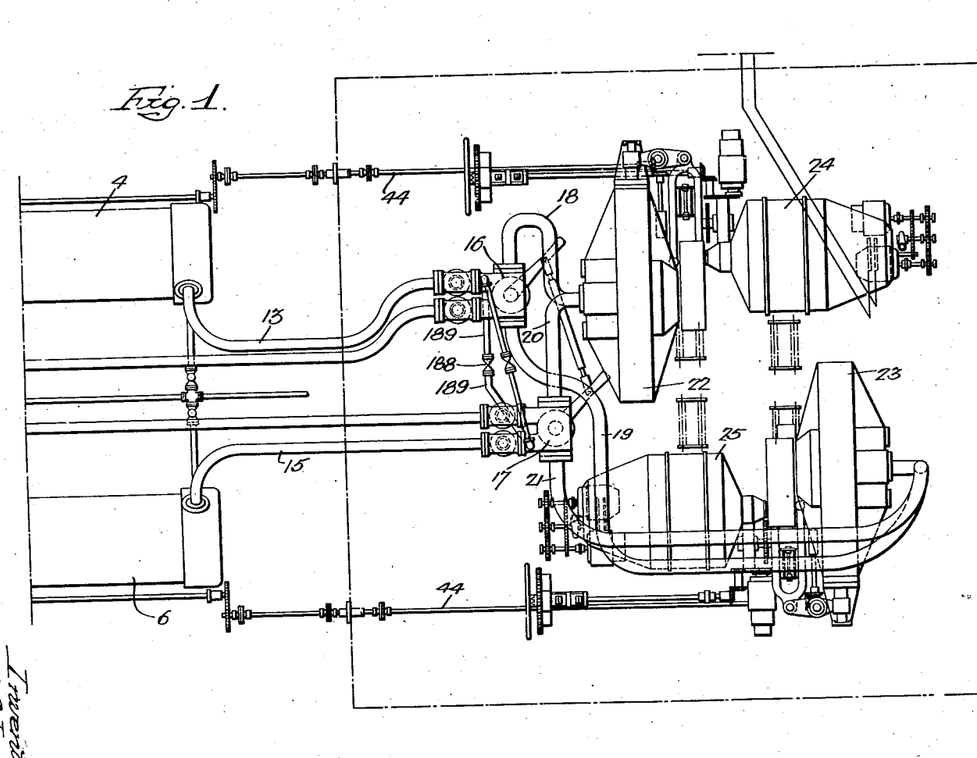
Figure 1 is a plan view of one end of a steering mechanism made in accordance with my invention showing the pumping units and a portion of the rudder-actuating rams.
Figure 2:
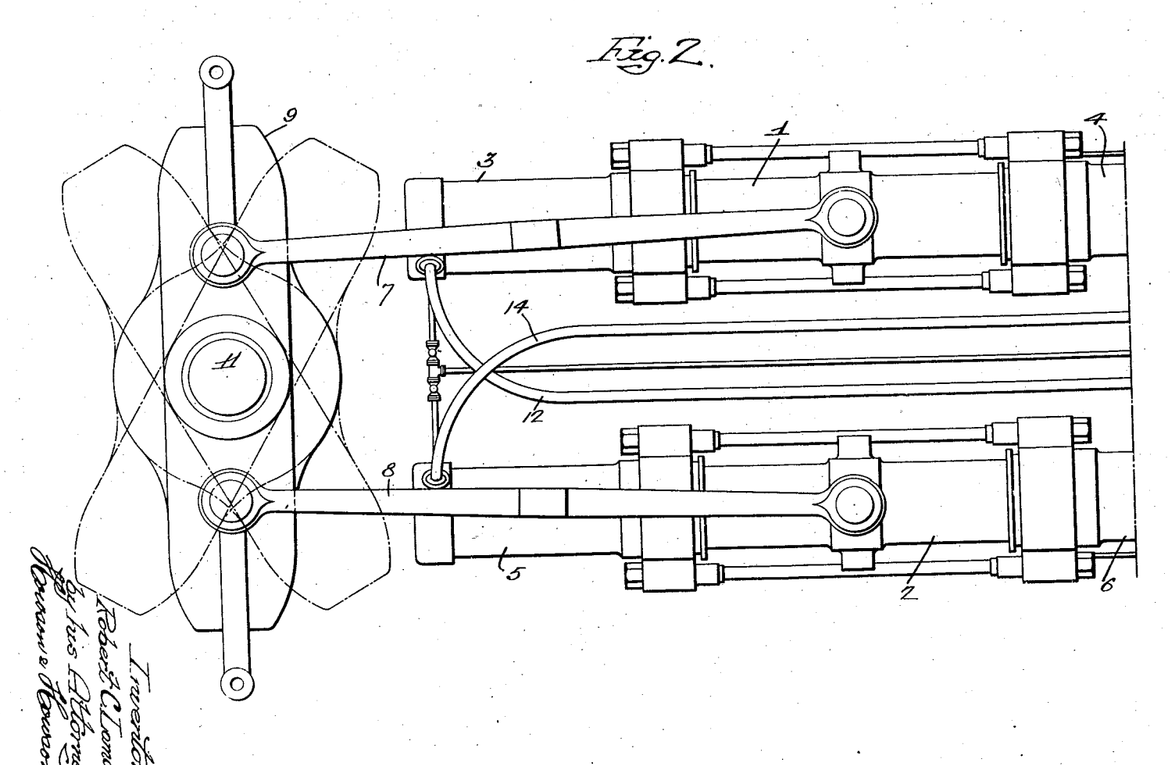
Fig. 2 is a plan view illustrating the remaining portions of the rams and cylinder assembly and the connection to the rudder post.

With reference to the drawings, the embodiment of my invention therein illustrated comprises a pair of rams 1 and 2 the opposite ends of which operate in cylinders 3—4 and 5—6, the two sets of cylinders 3—4 and 5—6 being mounted in parallel relation as illustrated. The rams 1 and 2 are respectively connected by link rods, two of which are shown at 7 and 8, to a cross head 9 secured in the present instance directly to the rudder stock 11. Reciprocation of either of the rams 1 and 2 results in an oscillation to the positions shown in dotted lines of the cross head 9; and in normal practice, the rams are actuated simultaneously in opposite directions to turn the rudder post 11 as required. For actuating the rams as described, fluid is introduced under pressure to the outer ends of the cylinders through pipes 12, 13, 14 and 15, these pipes being connected through suitable control valves 16 and 17 and pipes 18, 19, 20 and 21 to each of a pair of pumps 22 and 23 which respectively are driven by electric motors 24 and 25. These pumps preferably are of the reversible discharge, variable stroke and variable capacity type, such for example as illustrated in the U. S. Patent Number 1,924,124, and are so connected through the aforesaid pipes and valves to the ram cylinders that regardless of the direction of discharge, the rams are actuated as stated above simultaneously in opposite directions, and a reversal of said direction of discharge results in a reversal in the direction of movement of the rams. As hereinafter set forth, means is provided for regulating the direction and rate of discharge of the pumps, this means affording a flexible and readily manipulated control for the movement of the rams. The pump units 22, 24 and 23, 25 constitute alternative driving means for the rams, and in the present instance are operated individually, the valves 16 and 17 constituting means for connecting the operative unit to the ram cylinders and for disconnecting the inoperative unit as required.

Figures 3, 23:
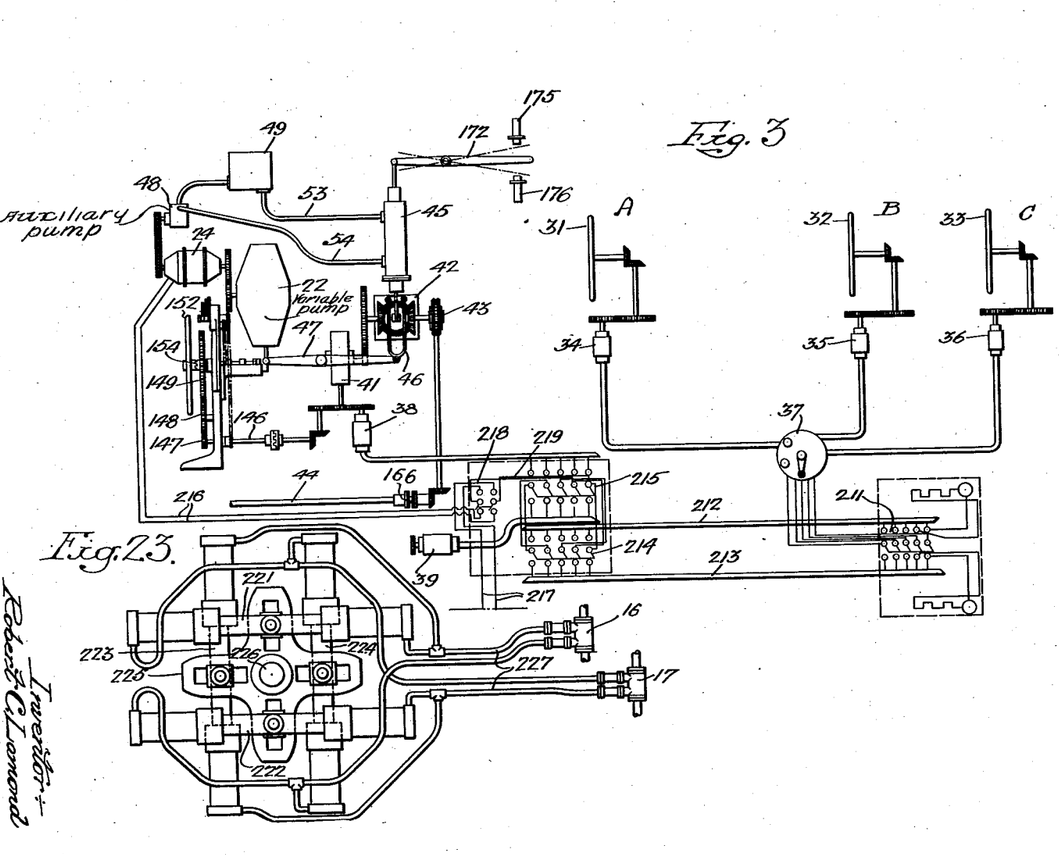
Fig. 3 is a diagrammatic view illustrating the essential parts of one of the control units.
Fig. 23 is a diagrammatic plan view illustrating a modified form of ram assembly to which my invention is applicable.

Referring to Fig. 3, which shows a diagrammatic layout of the control system in its relation to the two power units, only one of the latter being shown, it will be noted that in the illustrated embodiment three steering stations designated respectively A, B and C, are provided which may be located on the vessel as desired. At each of the three positions is placed a steering wheel, 31, 32 and 33 respectively, each of which is connected through suitable reduction gearing with an electric generator, these generators being designated respectively 34, 35 and 36. All of these generators are electrically connected with a control switch 37 and through said switch with an electrical system, hereinafter described in detail, through which system and the control switch 37 the generators may be individually connected with either one of a pair of synchronous motors 38 and 39 respectively operatively associated with the control mechanism of the two power units.

Since the control systems for the two power units are identical, that one associated with the motor 38 alone is illustrated. As shown, the motor 38 is operatively connected with a speed reduction unit 41 which in turn is operatively connected with one side of a differential gear 42, the other side of said gear being connected, in the present instance through a worm wheel and worm 43, to a follow-up shaft 44 operatively associated in the usual manner with the rams 1 and 2. The differential 42 is also operatively connected with a valve element constituting a part of a differential control cylinder 45, the arrangement being such that when the differential is actuated either through the gear unit 41 or through the follow-up 44, an adjustment of the said valve element occurs. The cylinder 45 also contains a hydraulically-actuated plunger which is operatively connected through a member 46 with one end of a pivoted lever 47, the other end of which is connected to the mechanism of the pump 22 which controls the direction of discharge and the stroke of the pump. The motor 24 which drives the pump 22 is also operatively connected with a pump 48 which preferably is of the same general type as the pump 22 and which is connected in an independent hydraulic system with the cylinder 45, the pump 48 supplying the fluid pressure for actuating the plunger within the cylinder 45 which as previously set forth is connected with the lever 47. A make-up tank 49 is shown in operative association with the hydraulic system including the pump 48 and the cylinder 45, and this tank may also supply the main fluid system.

The general operation of this control mechanism, briefly described, is as follows: Assuming that the steering station A is operative at the moment, rotation of the steering wheel 31 results in actuation, through the connecting reduction gearing, of the generator 34 and effects a corresponding movement of the armature of the synchronous motor 38, the generator and motor being connected through the switch 37 and the intervening electrical system. Actuation of the motor 38 results in an actuation through the reduction gear unit 41 of the associated side of the differential 42, and by reason of the fact that the opposite side of the differential is held by the follow-up, this results in an adjustment of the valve element within the cylinder 45 from a neutral position to one permitting flow to one or the other end of the plunger in said cylinder. The resulting movement of the plunger acting through the lever 47 effects an adjustment of the discharge adjusting means of the pump 22, and as a result of this adjustment, fluid is forced under pressure by the pump 22 into the outer ends either of the sets of cylinders 3, 6 or 4, 5, according to the direction of the pump discharge, and an evacuation of the other two of said cylinders whereby a movement of the rams 1 and 2 is effected. This movement of the plunger also tends to return the plunger to a neutral position with respect to the valve whereby the fluid pressure from the pump 48 to the cylinder 45 is interrupted, it being apparent that the extent of the original movement of the valve determines the resulting travel of the plunger and accordingly the adjustment of the pump discharge adjusting means. The movement of the rams, however, effects an actuation of the follow-up shaft 44 and a movement of the associated side of the differential 42 in a direction tending to return the valve element of the cylinder 45 to its original position, the opposite side of the differential being now held by the reduction gear unit 41. As a result of this second adjustment of the valve, fluid is supplied to the cylinder 45 from the pump 48 at the opposite side of the plunger which causes a return movement of the plunger in the cylinder to its original position in which the valve again interrupts the flow of fluid to the cylinder. This return movement of the plunger also has the effect, acting through the lever 47, of returning the discharge adjusting means of the pump 22 to its original neutral position, which completes the cycle and leaves the various parts stationary, the rudder of the vessel having been adjusted into a position in which it will remain until the steering wheel 31 is again moved.

Figures 4, 5, 6:
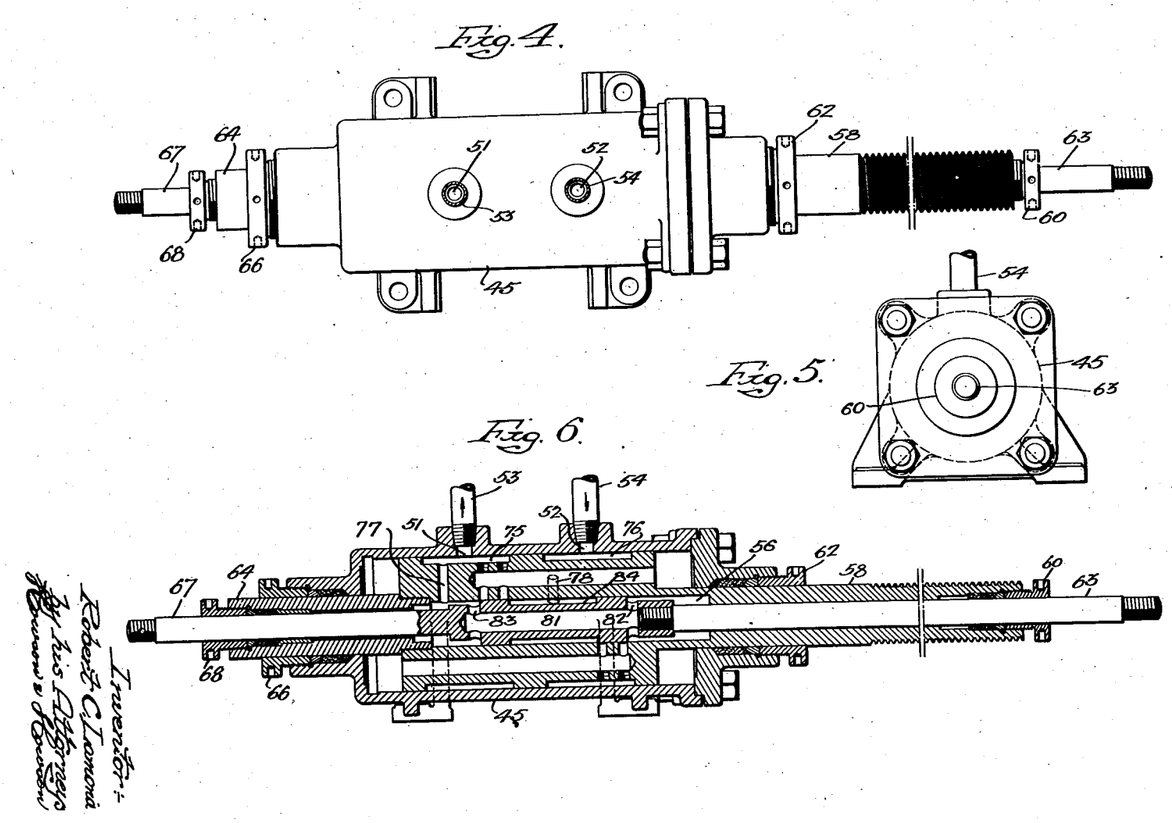
Fig. 4 is a plan view of one of the control cylinders.
Fig. 5 is an end elevation of the control cylinder.
Fig. 6 is a longitudinal sectional view through one of the control cylinders showing the parts thereof in the neutral position.

The operation of the system as described above will be readily understood from a description of the detailed structure of the various elements, the actual form of the said elements and their relation to the power unit being illustrated in Figs. 4 to 21, inclusive. Referring to Figs. 4 to 9, inclusive, it will be noted that the control cylinder 45 is provided with ports 51 and 52 which are respectively connected through pipes 53 and 54 to the pump 48 and to the make-up tank 49. In the interior of the cylinder is a plunger 55 which has a central longitudinal chamber 56 in which operates a valve 57. The plunger 55 has an integral extension 58 at one end of reduced diameter which extends through the cylinder head 59, this head being formed with a recess for packing 61 which surrounds the plunger extension 58 and which is held in place by a gland 62 threaded in the outer end of the head and through which the said plunger extension extends. The plunger extension 58 is hollow for passage therethrough of a stem 63 secured to one end of the valve 57. As shown in Fig. 4, the outer end of the extension 58 is externally threaded and is also formed in its interior with a suitable stuffing box, including a threaded retainer gland 60, through which the valve stem 63 extends. At the opposite end, the plunger 55 is provided with a hollow stem 64 which in the present instance is threaded into the end of the plunger at one end of the chamber 56. The stem 64 projects through the adjacent end of the cylinder 45, the end portion of the cylinder being formed with a recess for reception of packing 65 which embraces the stem 64 and is held in position by a gland 66 threaded into the outer end of the cylinder casing. Through the hollow interior of the stem 64 extends a valve stem 67 which at its inner end connects with the valve 57, and a suitable stuffing box including a gland 68 is formed in the outer end of the stem 64 through which the valve 67 extends and which prevents leakage from the interior of the cylinder through the stem 64.

The plunger 55 is formed with a longitudinal channel 71 which extends inwardly from one end of the plunger and with a corresponding channel 72 which extends inwardly from the opposite end of the plunger. From the inner end of the channel 71 ports 73 extend inwardly to establish communication between the channel 71 and the chamber 56, corresponding ports 74 providing for communication between the chamber 56 and the channel 72. In its outer periphery, the plunger 55 is provided with two circumferential recesses, 75 and 76 respectively, which regardless of the position of the plunger in the cylinder are in continuous communication with the ports 51 and 52 respectively. From the recess 75 a port 77 extends inwardly to the chamber 56, and a corresponding port 78 affords communication between the chamber 56 and the recess 76. The connections between the inner ends of the ports 73, 74, and the ports 77 and 78 are controlled by the valve 57. This valve has a central longitudinal chamber 81 which communicates with the chamber 56 through a port 82 at one end and a port 83 at the other end; and the valve also is provided in its outer periphery with an elongated recess 84 which is of sufficient length to embrace the ports 73 and 78 or the ports 78 and 74, depending on the position of the valve.

In Fig. 6, the valve and plunger are shown in what may be termed the neutral positions. In this position, it will be noted that the pipe 54, which is shown as delivering fluid to the cylinder from the pump 48, is in communication through the port 52 with the plunger recess 76, and through the port 78 with the valve recess 84. The valve is so positioned, however, that the recess 84 is dead-ended so that the fluid pressure has no tendency to move either the plunger or the valve. The pipe 53, which is shown as connected to the suction side of the pump in this relative position of the parts is connected through the port 51 with the plunger recess 75 and through the port 77 with one end of the chamber 56. The ends of this chamber, however, are connected through the valve ports 83 and 82 and the central valve passage 81 so that here also the pressures are balanced with regard both to the valve and to the plunger.

Figures 7, 8, 9:
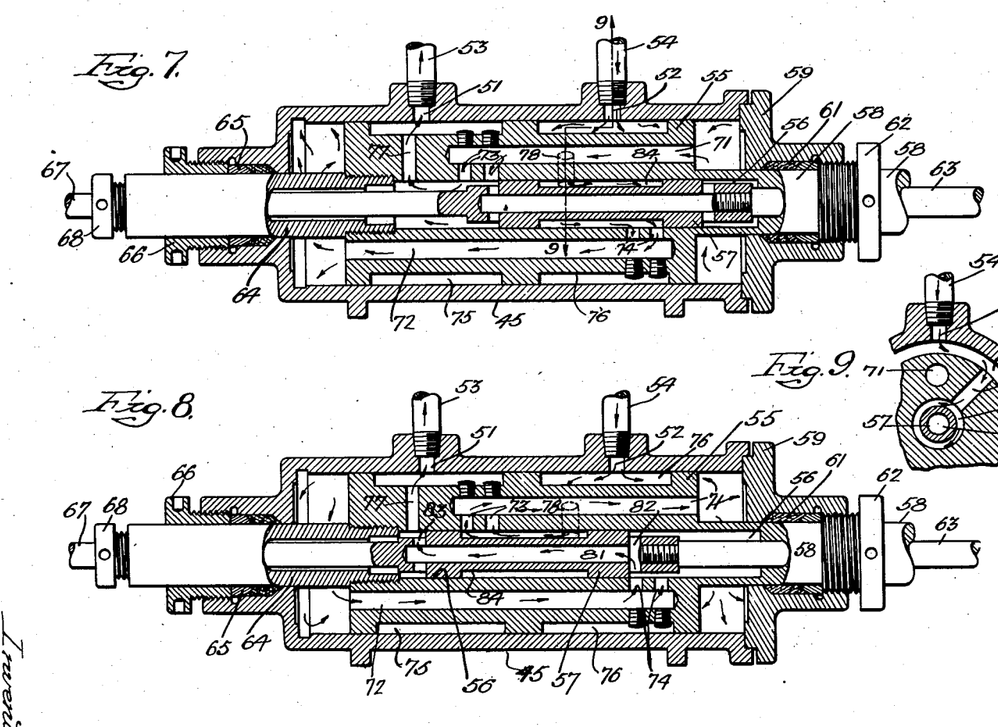
Figs. 7 and 8 are longitudinal sectional views of the control cylinders showing the parts thereof in the full stroke left and right rudder positions, respectively.
Fig. 9 is a fragmentary section on the line 9—9, Fig. 7.

In Fig. 7, the valve 57 is shown in the extreme right-hand position. In this position, the valve recess 84 communicates with the inner ends of the ports 78 and 74 so that fluid entering through the pipe 54 passes into the plunger passage 72 and therethrough to the left-hand end of the cylinder, thereby exerting pressure tending to move the plunger towards the right. The ports 73 are uncovered by the valve so that the suction pipe 53 is in communication through the plunger recess 75, port 77 and ports 73 with the plunger channel 71, and through this channel with the right-hand end of the cylinder. In this adjusted position of the valve, a movement of the plunger towards the right will occur until the ports 73 and 74 are brought into their original positions relative to the valve 57, at which time the movement of the plunger will cease.

In Fig. 8, the valve is shown adjusted to the extreme position towards the left end of the cylinder, and it will be noted that in this instance the pipe 54 through the port 52, plunger recess 76, port 78, valve recess 84, port 73 and plunger channel 71 with the right-hand end of the cylinder. Also the pipe 53 is in communication through the port 51, plunger recess 75, port 77, valve ports 83, valve passage 81, port 82, port 74 and plunger channel 72 with the left end of the cylinder. Fluid pressure thus causes a movement of the plunger towards the left-hand end of the cylinder, which movement continues until the plunger and the valve are again in a relative neutral position. It will thus be noted that any movement of the valve from the original centered or neutral position, shown in Fig. 6, results in a corresponding movement in the same direction of the plunger 55 and an automatic cessation of the movement of the plunger when the latter assumes its original relative position with respect to the valve. Hereinafter, when reference is made to the neutral position of the control cylinder parts, it will be understood as referring to the true centered or neutral position as shown in Fig. 6.

Referring now to the operation of this valve in relation to the other parts of the mechanism as outlined above, it may be assumed that in any stationary position of the rudder, the control cylinder parts normally are in the relative positions shown in Fig. 6. If now the position of the rudder is to be changed, the steering wheel 31 is moved in the appropriate direction and to an extent corresponding to the extent of rudder change desired. Through the generator 34 and motor 38, the gear unit 41 and the differential 42, the valve 57 is shifted from the neutral position in a direction corresponding to the direction of movement of the steering wheel 31, the extent of movement of the valve depending on the amount of movement of the steering wheel. Movement of the valve 57 results as previously set forth in a movement in the same direction of the plunger 55, and as a result of this movement, the discharge control of the pump 22 is shifted to cause a flow of fluid to the ram cylinders, resulting in actuation of the rams and a corresponding movement of the rudder in the desired direction. The adjustment of the pump discharge adjusting means bears a fixed relation to the movement of the plunger 55 to which it is operatively connected through the lever 47, so that in effect, the operation of the pump and the resultant movement of the rudder is in exact synchronism with the movement of the steering wheel. Thus movement of the wheel through a relatively large angle results in a correspondingly great angular movement of the rudder, and where the movement of the wheel is relatively slight, the resultant adjustment of the rudder is correspondingly small.

Following initial adjustment of the valve, the resulting movement of the plunger 55 will be automatically interrupted when the plunger assumes a position with respect to the valve corresponding to the relative positions of these parts before the valve adjustment. Simultaneously with the movement of the rams, however, the follow-up acting through the shaft 44, the worm 43 and the differential 42 tends to return the valve towards the original or neutral position, which effects an opposite movement of the plunger 55, which is interrupted when the plunger also reaches its original or neutral position. This return movement of the plunger also effects a re-adjustment of the pump discharge adjusting device to the original or neutral position, whereupon movement of the rams 1 and 2 ceases, the rudder remaining in the position to which it has been newly adjusted. The movement of the plunger 55 closely follows the movement of the valve, and the movements of the rudder are practically coincidental with the movements of the steering wheel, the rudder action continuing while the wheel is in motion and stopping practically simultaneously with the stopping of the wheel.

The motor 24 is in continuous operation, as also is the pump 48, and in order to prevent the development of undue pressures in the hydraulic system associated with this pump when the cylinder is in the neutral position, means is provided for automatically adjusting the pump discharge, so that when the pressure in the system has reached a predetermined maximum, the discharge is automatically discontinued until such time as the pressure drops. Such an automatic pressure control device is disclosed in U. S. Patent No. 1,628,603.

Figure 10:
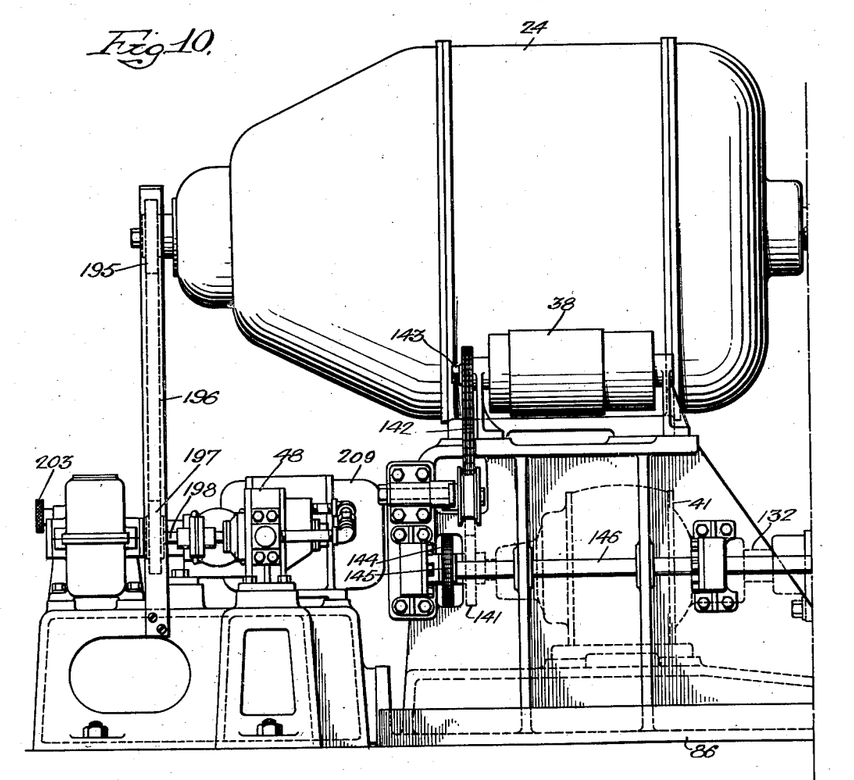
Fig. 10 is a side elevational view of a portion of one of the control units including the electric motor.
Figures 11, 22:
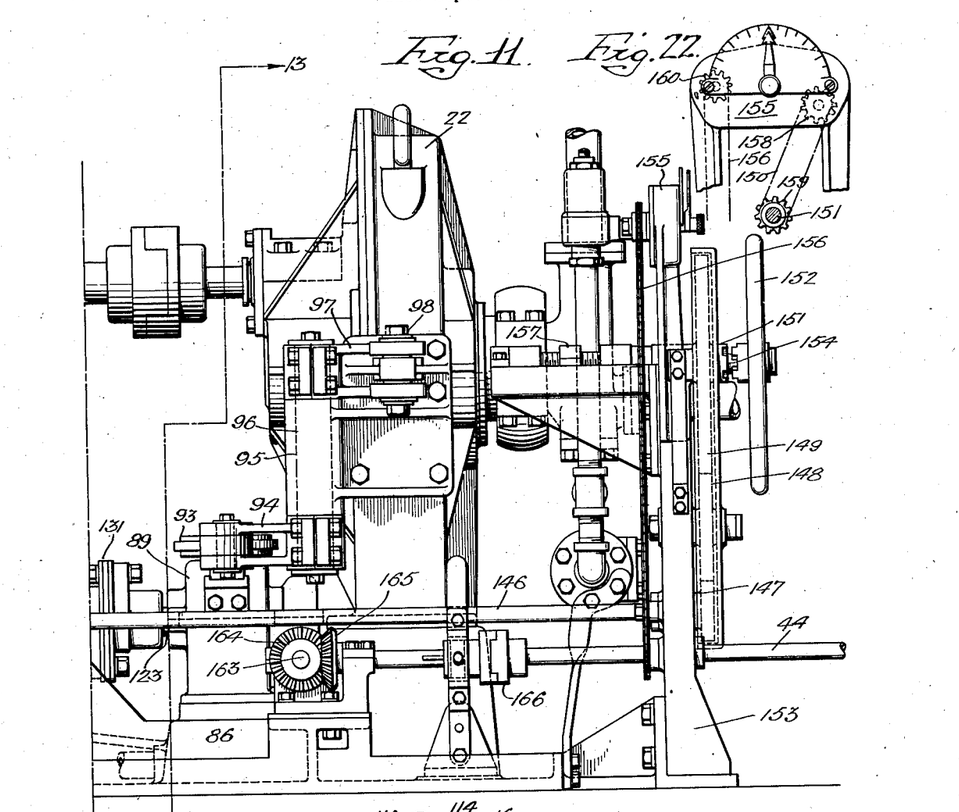
Fig. 11 is a side elevation of the remaining part of the control unit including the pump.
Fig. 22 is a fragmentary partial sectional view showing in front elevation the "trick" wheel indicator.
Figure 12:
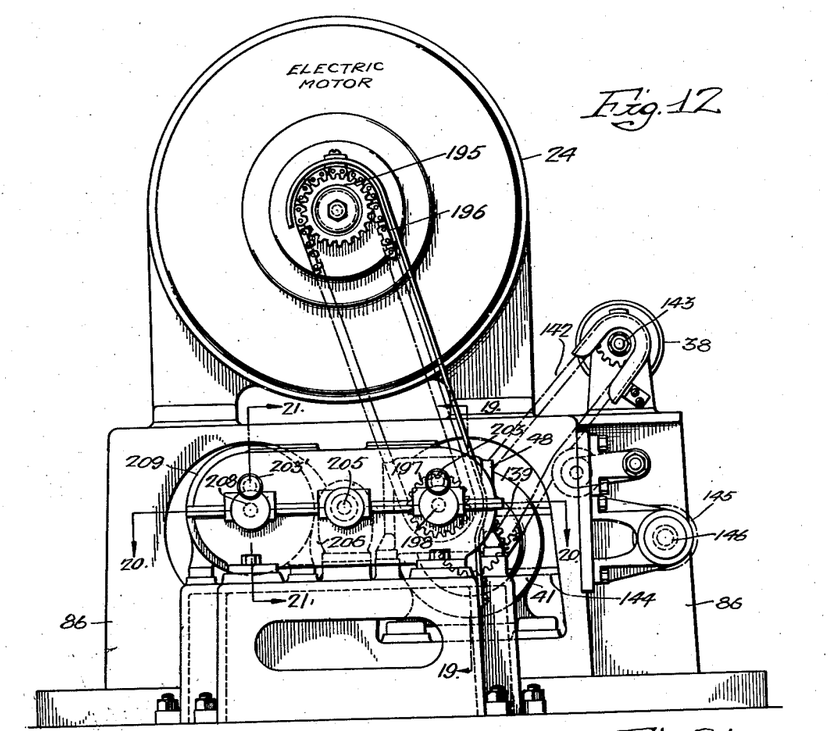
Fig. 12 is an end elevation of the control unit shown in Figs. 10 and 11.
Figures 13, 15, 24:
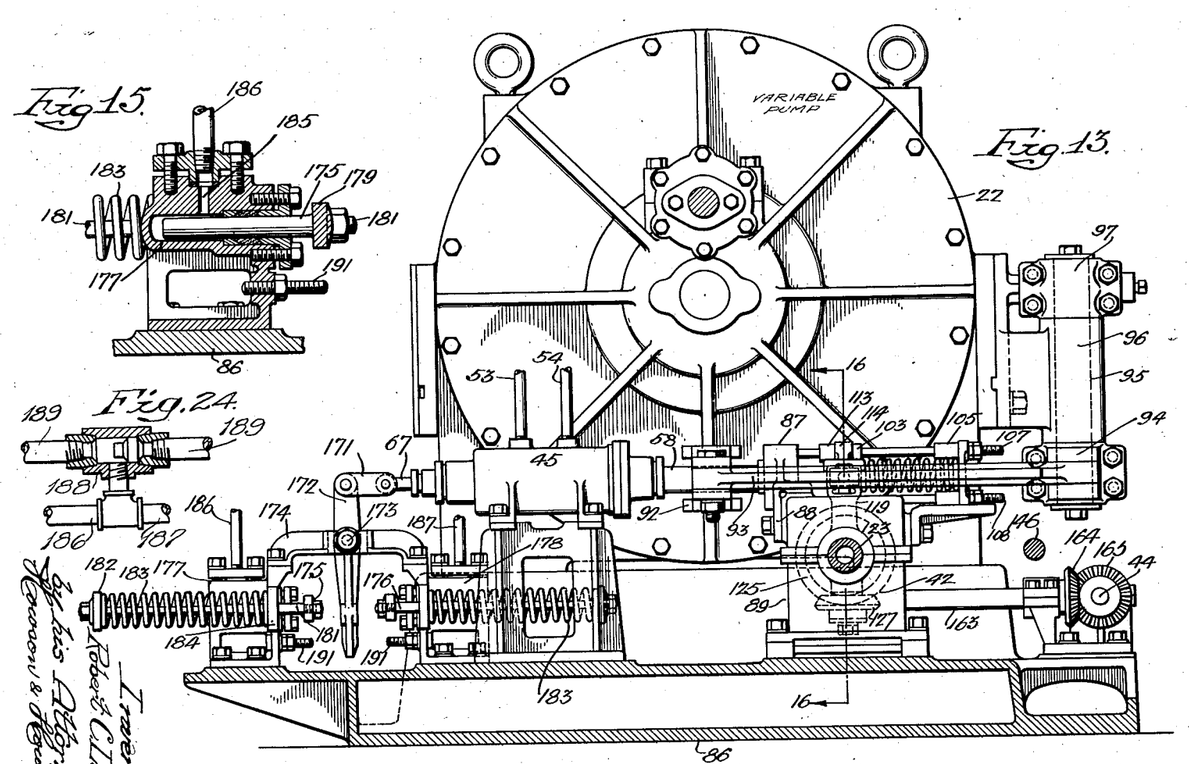
Fig. 13 is a transverse sectional view on the line 13—13, Fig. 11.
Fig. 15 is a fragmentary sectional view on the line 15—15, Fig. 14.
Fig. 24 is a fragmentary end view partly in section showing the piping connections and shuttle valve leading from the pressure lines to the cylinders of the safety mechanism.
Figure 14:
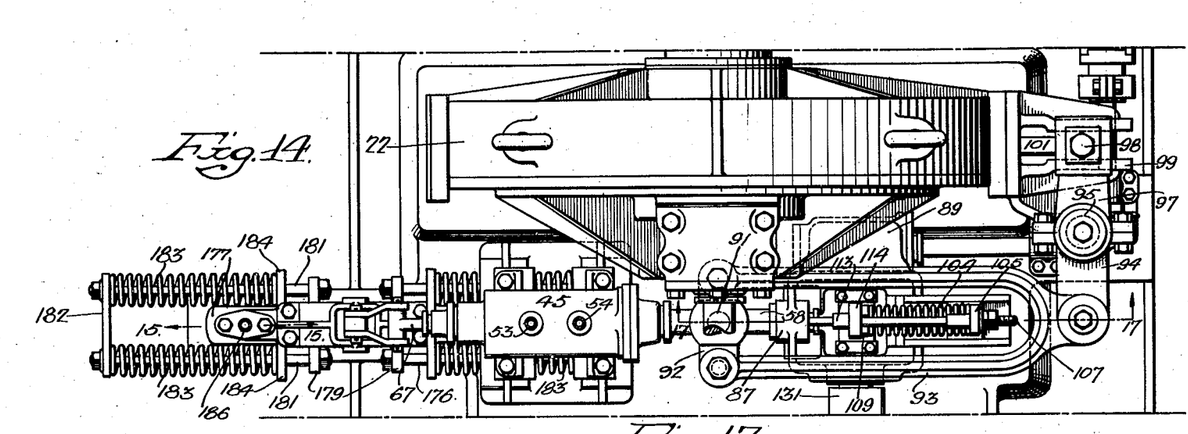
Fig. 14 is a plan view of that portion of the control mechanism shown in Fig. 13.
Figure 16:
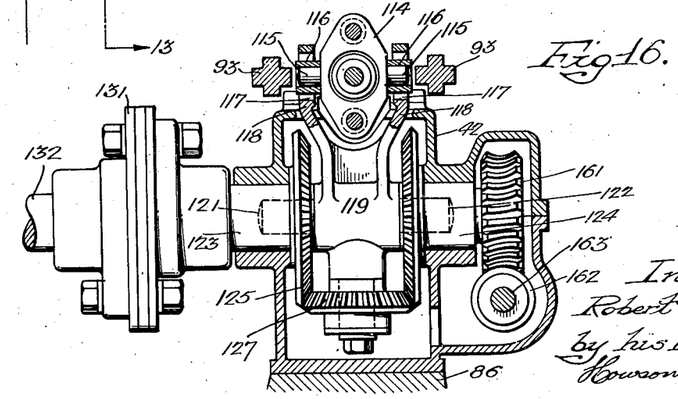
Fig. 16 is a section on the line 16—16, Fig. 13.
Figures 17, 18:
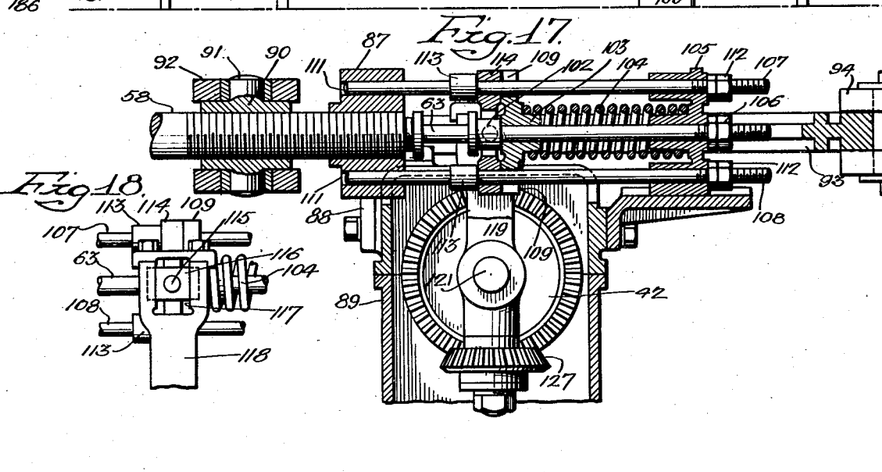
Fig. 17 is a section on the line 17—17, Fig. 14.
Fig. 18 is a fragmentary view showing in elevation a detail of the control unit.

As shown in Figs. 10 and 11, the main pump and motor of each of the units is mounted on a common base 86, and in this assembly, as shown in Figs. 13 and 14, the control cylinder 45 is positioned adjacent one end of the pump and intermediate the pump and the motor. The plunger extension 58 extends through a guide 87 carried by a bracket 88 secured to one side of the housing 89 of the differential 42, said housing being secured to the base 86 as illustrated. Intermediate the cylinder 45 and the guide 87, the extension 58 carries a nut 90 to which is pivotally connected, through trunnions 91 upon the nut, a cross head 92. To the outer ends of the cross head are secured the arms of a yoke 93 which extends longitudinally beyond the end of the extension 58, and at its outer end is pivotally secured to one end of a lever 94. The other end of this lever is suitably secured to the lower end of a vertical shaft 95 supported in a bearing 96 on a bracket secured to one side of the housing of the pump 22, and the upper end of this shaft carries an arm 97, the outer end of which is secured to a cross head 98 slidably supported in guides 99 also formed on the bracket which carries the bearing 96. The cross head 98 has also secured thereto the operating rod 101 of the pump discharge control device through which, as previously set forth, the direction of discharge and the stroke of the pump are adjusted. It will be apparent that movement of the plunger 55 of the control cylinder 45 through the above described mechanism results in a movement of the actuating rod 101 of the pump regulating mechanism.

Referring to Figs. 13 to 18, inclusive, it will be noted that the valve stem 63, which as previously set forth projects through and beyond the end of the plunger extension 58, carries intermediate its ends a collar 102 which forms an abutment for a spring retainer 103 slidably mounted on the outer end of the valve stem, this retainer constituting a seat for one end of a coiled spring 104, the other end of which engages the other end of a second retainer 105 supported on the outer end of the valve stem and retained in position by nuts 106 on the outer end of the stem, the spring 104 being thus confined between the retainers 103 and 105, and the nuts 106 providing means for adjusting the compression of the spring. Also supported in the retainer 105 are a pair of rods 107, 108 which extend parallel to the stem 63 through slots 109 in the retainer 103 and have their other extremities slidably disposed in guide openings 111 in the guide member 87. The other ends of the rods 107, 108 are threaded for reception of nuts 112 which abut the outer face of the spring retainer 105; and between the spring retainer 103 and the guide member 87, each of the rods carries fixed thereto a collar 113. Closely confined between the collars 113 and the face of the spring retainer 103 by pressure of the spring 104 is a cross head 114 apertured for passage of the rods 107 and 108, this cross head having trunnions 115, see Figs. 16 and 18, which respectively enter openings in a pair of blocks 116. These blocks are slidably supported in vertical guide slots 117 in the arms 118 of a pivoted lever 119 forming an element of the differential 42. This lever carries at opposite sides trunnions 121 and 122 which are journaled respectively in stub shafts 123 and 124 mounted in bearings in opposite sides of the housing of the differential mechanism 42. The shaft 123 carries at its inner end a bevel gear 125, while a similar bevel gear 126 is secured to the inner end of the shaft 124. Rotatably mounted on the lower end of the lever 119 is a third bevel gear 127 which meshes with both the gears 125 and 126.

Assuming now that one of the shafts 123, 124 is held fixed while the other is rotated, it will be apparent that this will result in a movement on the fixed gear of the gear 127 and a consequent partial rotation of the lever 119. Since the cross head 114 to which the upper end of this lever is secured is closely confined between the collars 113 and the spring retainer 103, it will be apparent that the partial rotation of the lever 119 will result in a longitudinal movement in the corresponding direction of the rods 107 and 108. If the cross head 114 moves to the left, see Fig. 17, the impulse applied to the rods 107, 108 is through the collars 113, while if the movement is to the right, the movement of the lever 119 is transmitted to the rods through the spring retainer 103, the spring 104 and the retainer 105, which then acts against the nuts 112. Movement of the rods to the left transmits movement through the nuts 112, the spring retainer 105, the spring 104, the retainer 103 and the collar 102 to the valve stem 63; while movement of the rods 107 and 108 to the right transmits movement through the retainer 103, the spring 104, the retainer 105 and the nuts 106 to the valve stem 63. In either direction of movement, the transmission is through the spring 104, and the spring 104 obviously also provides for free movement in either direction of the stem 63 independently of the cross head 114 and the lever 119 of the differential mechanism.

Figure 19:
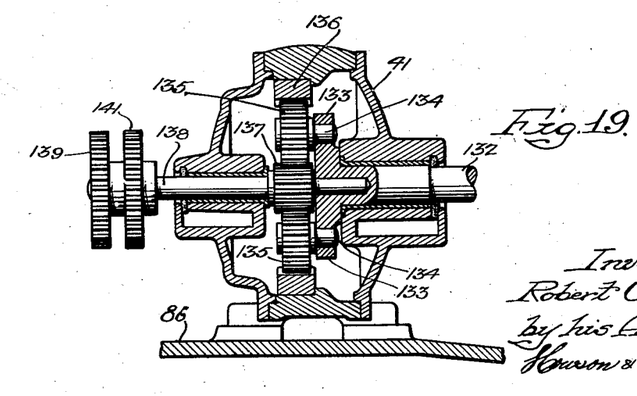
Fig. 19 is a fragmentary section through one of the gear units taken on the line 19—19, Fig. 12.

Referring to Figs. 10 and 11, the outer end of the shaft 123 is connected through a coupling 131 with a shaft 132 extending to the reduction gear unit 41, this unit being shown in detail in Fig. 19. The shaft 132 passes through a bearing in the housing of said unit and carries at its inner end a spider 133 which carries studs 134 upon which are journaled pinions 135. These pinions mesh with an annular orbit gear 136 secured in the housing and also mesh with a sun gear or pinion 137 which is carried by a shaft 138 which extends through the opposite side of the housing. The inner end of the shaft 138 is extended and finds a bearing in the end of the shaft 132; and the outer end of the shaft 138 carries a pair of gears 139 and 141. The gear 141 is connected through a chain 142 to a gear 143 carried by the shaft of the synchronous motor 38. The gear 139 is connected through a chain 144 to a gear 145 upon a shaft 146 suitably journaled in the base 86, this shaft at its other end having a gear 147 which through gears 148 and 149 are connected to the shaft 151 of a "trick" wheel 152, the gears 148 and 149 and the shaft 151 being journaled in a standard 153 secured in the present instance to one end of the base 86. In the present instance, also, the wheel 152 carries one element of a clutch 154 through which it may be operatively connected with the shaft 151 when such connection is required. The standard 153 also carries an indicator 155 which is operatively connected through a chain and sprockets 158, 159 with the shaft 151, and also through a sprocket 160 and chain 156 with the follow-up shaft 44, this indicator showing the rudder position for any position of the "trick" wheel 152 when the latter is being used for steering. The shaft 151 carries at its inner end a limit stop device 157 which restricts rotation of the shaft in both directions. The "trick" wheel 152 provides for direct manual operation of the steering gear and is intended primarily for emergency steering.

Referring again to Fig. 16, it will be noted that the stub shaft 124 carries at its outer end a worm wheel 161 which is engaged by a worm 162 on a shaft 163. The shaft 163 carries at its outer end, see Fig. 11, a bevel gear 164 which meshes with a second bevel 165 on the follow-up shaft 44. A clutch 166 is also provided on this shaft for disconnecting the shaft 44 from the differential 42. It will be noted from the above that the shaft 124 of the differential mechanism 42 and the gear 126 carried thereby is actuated from a single source, namely, the follow-up mechanism, while the shaft 123 and gear 125 may be operated from either one of two sources, namely, the synchronous motor 38 or manually from the "trick" wheel 152. Normally, the trick wheel will be inoperative, and operation of the said shaft 123 and gear 125 will be solely through the motor 38.

Assuming that the motor 38 is actuated in the manner previously described from the steering wheel 31, the gear 126 of the differential 42 being held stationary by the worm 43, it will be apparent that actuation of the gear 125 of the differential through the motor 38 will result in a partial rotation of the lever 119 and actuation of the valve of the control cylinder 45, as previously described. The resulting motion of the rams will now actuate the follow-up shaft 44 and the gear 126 of the differential, which tends to turn in the opposite direction, thereby reversing the movement of the valve element of the control cylinder 45 and eventually returning it to its original position.

Referring now to Figs. 13, 14 and 15, it will be noted that the valve stem 67 is connected at its outer end through a link 171 with the upper end of a lever 172 pivotally supported at 173 in a bracket 174 on the base 86. The lower end of this bracket is positioned between the ends of a pair of plungers 175 and 176, which respectively operate in cylinders 177 and 178 mounted on the base 86. Each of these plungers carries adjacent its outer end a cross head 179, to the opposite ends of which are connected bolts 181 which extend rearwardly along the sides of the cylinder bodies and which jointly carry at their rear ends a cross piece 182. Each of the bolts 181 carries a spring 183 which springs are confined between the cross piece 182 and fixed extensions 184 on the cylinder bodies. These springs oppose movement of the plungers 175 outwardly of the cylinders and normally retain the plungers in a retracted position, as shown in the drawings. Each of the cylinders is provided with a port 185 which respectively communicate with pipes 186 and 187 which connect through a shuttle valve 188 and pipes 189 with the main hydraulic system, the arrangement being such that regardless of the direction of discharge from either of the pumps 22 and 23, both of the cylinders 177 and 178 are connected with the pressure side of the system. The springs 183 are calibrated for a predetermined pressure, and when the pressure in the main system reaches this predetermined point, the plungers 175 and 176 are forced outwardly and into engagement with the lever 172, thereby centering the lever and thereby moving the valve 57 of the control cylinder 45 to its neutral position. Adjustable stops 191 are provided which are adapted to be engaged by the lever 172 when the valve 57 is moved to its limiting position in either direction. It therefore is seen that the discharge of pump 22 may be controlled by adjusting the stops 191. As previously described, regardless of the setting of the parts of the control cylinder, the return of the valve element thereof to the neutral position, which return movement is provided for in the spring 104, insures an adjustment of the stroke adjusting means of the main pump to the neutral position, thereby discontinuing the pumping operation. This mechanism accordingly constitutes an automatic safety device which precludes development in the hydraulic system of unduly high pressures.

It will be noted that if for any reason the member 119 of the differential mechanism is prevented from moving during operation of the safety device described above, the resilient connection established through the spring 104 between the lever 119 and the valve stem 63 permits movement of the stem under the action of the safety device independently of the said lever 119.

Figure 20:
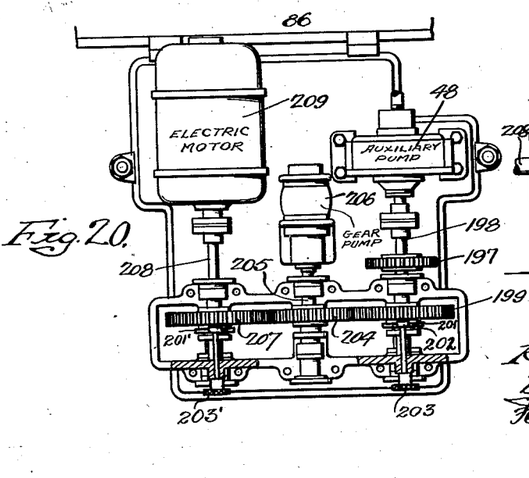
Figs. 20 and 21 are, respectively, sectional views on the lines 20—20 and 21—21, Fig. 12.
Figure 21:
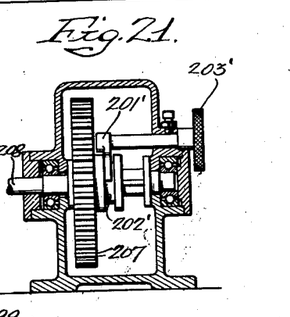

With reference to Figs. 10, 12, 20 and 21, it will be noted that the pump 48 which supplies the control cylinder 45 is mounted upon an extension of the base 86 at the outer end of the motor 24. This pump is adapted to be driven through a pinion 195 on the motor shaft which is connected through a chain belt 196 with a gear 197 on the pump shaft 198. This shaft is extended and carries at its outer end a gear 199, which as shown in Fig. 20 is splined to the shaft so as to be slidable thereon. The gear may be advanced or retracted by means of a fork 201 which occupies a circumferential recess 202 on the hub of the gear, this fork being connected through a sliding rod with a knob 203 at the outside of the housing. The gear 199 meshes with a gear 204 on the shaft 205 of a small gear or other pump 206 mounted on the base which provides a driving connection between the motor 24 and the said pump 206. Retraction of the gear 199, as described, takes it out of mesh with the gear 204. The gear 204 is adapted to mesh also with a gear 207 on the shaft 208 of a small electric motor 209 also mounted on the base, the gear 207 also being retractible out of engagement with the gear 204 by means of a fork 201' connected through a sliding rod with a knob 203', which fork engages in a recess 202' provided on a hub of gear 207. Accordingly both pumps may be driven from the main motor 24 or from the small motor 209. When the latter motor is employed to drive the pump 48, the chain 196 connecting the pump shaft 198 with the motor 24 should be disengaged from its gears. The arrangement also provides for independent operation from the motor 209 of the small pump 206. This latter pump is connected by suitable ducts (not shown) to the hydraulic system, and may be employed to drain and fill the latter, and means is also provided for connecting this pump with the interior of the bed-plate of the main pump 24 to remove leakage oil therefrom and to discharge this oil to the reserve tank of the system. Normally, the pumps 48 and 206 are driven from the main motor 24, the motor 209 being employed as set forth for draining the system and for emergency operations.

The electric system including the generators 34, 35, 36, and motors 38 and 39 is illustrated in Fig. 3. As therein shown, the elements of the switch 37 are connected to the blades of a double-throw switch 211 which provides for connecting the switch 37 in circuit with either of a pair of conductors 212, 213. These conductors are connected with a second double-throw switch 214 whereby either one or other of these lines may be connected to the blades of a third double-throw switch 215, these two switches providing for connecting either of the lines 212, 213 to the motors 38 and 39, depending upon which of the power units is to be operated. Alternating current is supplied to the system from suitable collector rings on the commutator ends of the main motors 24 and 25 and is carried to the system through lines 216, 217 which respectively connect to the fixed portions of a double throw switch 218, the blade of said switch being connected through lines 219 to the adjustable elements of the double-throw switches 215 and 214. The system provides for the selective operation of the power units and the connection of the operating source of alternating current to the synchronous motor system.

It is believed that the operation of the mechanism will be clear from the foregoing description. Attention is directed, however, to the use of the overhauling gear unit 41 in the transmission between the synchronous motor 38 and the gear 125 of the differential. Where a worm drive is used in this position, it is necessary to disengage the clutch 166 on the follow-up shaft of the inoperative power unit in order to prevent displacement of the valve 57 of that unit from the neutral position which would result when the power unit is again operated in a de-synchronization of the control mechanism. By employing the overhauling gear unit 41 it is unnecessary to disengage the follow-up of the inoperative unit since the overhauling gear unit functions to automatically maintain the synchronized relation of the control elements. The apparatus is extremely sensitive in operation, the rudder adjustment closely and accurately following the adjustments of the steering wheel and making possible the maintaining of the vessel with great accuracy on a selected course.

In Fig. 23 I have illustrated a main ram assembly comprising two sets of rams 221—222 and 223—224, each corresponding to the set of rams 1—2 of the previously described embodiment. The rams 223—224 are superimposed at right angles upon the rams 221—222 and the rams of both sets are connected through a cruciform rudder stock 225 to the rudder post 226. The corresponding ram cylinders of the two sets are connected together and to the fluid system through suitable piping designated generally by the numeral 227, the connections and operation being in all essential respects the same as that previously described.

There may be modifications in the structural details of the various elements without departure from the invention.

I claim:

1. In steering apparatus, the combination with a fluid motor, of a reversible discharge pump operatively associated with said motor, and means for actuating said pump, discharge adjusting means associated with the pump, and actuating means for said adjusting means including a second fluid motor, a manually actuated control valve for said second motor, means whereby movement of the said second motor resulting from an adjustment of the control valve automatically effects a relative resetting of said valve interrupting the operation of said second motor, follow-up means operated by said motor first named, for actuating said valve toward normal position to effect a corresponding movement toward normal position of said discharge adjusting means to reduce the discharge of said pump when the first mentioned motor has been operated the desired amount.

2. In steering apparatus, the combination with a fluid system including a fluid motor and a pump for supplying actuating fluid thereto, of means for controlling the flow of fluid in said system including an adjustable member connected to said pump, a second fluid motor for actuating said member, a valve controlling the operation of said second motor, means whereby actuation of said second motor resulting from an adjustment of the control valve effects an automatic reclosing of said valve to interrupt the operation of said second motor, follow-up means operated by said motor first named, for actuating said valve toward normal position to effect a corresponding movement toward normal position of said adjustable member to reduce the discharge of said pump when the first mentioned motor has been operated a predetermined amount.

3. In steering mechanism, the combination with a fluid system including a driven member and a pump for supplying fluid thereto, of a differential control cylinder for controlling the flow of fluid in said system, said cylinder comprising a fluid-actuated plunger, means for introducing fluid to said cylinder to actuate the plunger, and a valve in said cylinder movable relative to the plunger and controlling the flow of actuating fluid to the cylinder, means for adjusting said valve to afford a predetermined actuation of the plunger, means operative by the resulting movement of said plunger for closing the valve to interrupt the flow of fluid to the cylinder, and a follow-up mechanism connecting said valve to said driven member whereby movement of the latter effects a movement of said valve toward normal position to effect a corresponding movement toward normal position of said plunger to thereby reduce the supply of fluid to the system delivered by said pump.

4. In a steering apparatus, the combination with a pump, of control means associated with said pump adapted in neutral position to render the pump inoperative and in positions at different sides of said neutral position to effect a discharge of said pump in different directions; a fluid system including said pump and a rudder-actuating fluid motor; and means for actuating said pump control including a differential cylinder including a fluid-actuated plunger, means for applying fluid pressure to said cylinder to actuate the plunger, a valve associated with said plunger for controlling the flow of fluid to the cylinder and to control the direction of movement of said plunger by the actuating fluid, said plunger having a neutral position in the cylinder corresponding to the neutral position of said pump control means and said valve also having a neutral position in which the flow of fluid to the cylinder is normally interrupted; means whereby adjustment of said valve from a neutral position in either direction results in a corresponding movement of the plunger and a movement of the pump control from the neutral position; follow-up means operated by said rudder actuating motor for moving said valve toward neutral position to effect a corresponding movement toward neutral position of said plunger and control means, and means automatically operative when the pressure in said system reaches a predetermined maximum for moving said valve into the neutral position whereby a corresponding movement of the said plunger to the neutral position is effected and a return of the pump control to neutral interrupting flow of fluid in the system.

5. The combination with a fluid motor, of a pump for actuating said motor, adjustable control means for said pump, a hydraulic cylinder, a plunger operative in said cylinder and connected to said pump control means, a valve controlling the operation of said plunger, and means for actuating the valve including a differential mechanism, manually-actuated valve-operating means connected to one side of said differential, and a follow-up operatively associated with said fluid motor and connected to the other side of said differential.

6. The combination with a fluid motor, of a pump for actuating said motor, adjustable control means for said pump, a hydraulic cylinder, a plunger operative in said cylinder and connected to said pump control means, a valve controlling the operation of said plunger, means whereby adjustment of said valve effects a predetermined movement of the plunger and a subsequent interruption in the flow of actuating fluid to the cylinder, and means for actuating the valve including a differential mechanism, manually-actuated means connected to one side of said differential, and a follow-up actuated by the said motor and connected to the other side of said differential, said follow-up being effective to return the valve to a position from which it is adjusted by said manual means.

7. The combination with a fluid motor, of a pump for actuating said motor, adjustable control means for controlling the operation of said pump, a second hydraulic motor for actuating said control means, a valve for controlling the operation of said second motor, and means for actuating said valve including a differential, manual valve-actuating means associated with one side of said differential, and a follow-up actuated by the first-named motor and connected to the other side of said differential, said follow-up being operative to return the valve to a position from which it was originally adjusted by said manual actuating means.

8. The combination with a fluid motor, of a pump for actuating said motor, adjustable control means for controlling the operation of said pump, a second hydraulic motor for actuating said pump control means, a valve for controlling the operation of said second pump control motor, a manually-actuated element, a follow-up device actuated by the first-named motor, and a differential operatively connecting both said manual element and the follow-up with the said valve, said follow-up being effective to return the valve to a position from which it has been adjusted by said manual means.

9. The combination with a fluid system including a fluid-actuated motor, of a pump for actuating said motor, adjustable control means for controlling the operation of said pump, a hydraulic motor for actuating said control means, a valve controlling the operation of said pump control motor, a manually-actuated element, an overhauling gear unit connected with said element, a follow-up actuated by the first-named motor, worm gearing operatively connected with said follow-up, and a differential for operatively connecting the said overhauling gear unit and said worm gearing to the said valve.

10. The combination with a fluid system including a pump, of adjustable control mechanism for controlling the operation of said pump, a fluid motor for actuating said control means, a valve controlling the operation of said motor, operating mechanism for said valve, and flexible means for connecting said valve to the said operating mechanism to permit adjustments of said valve independent of said mechanism, said flexible means comprising a coil spring, a pair of seats for said spring slidably mounted on said valve, and means for retaining said seats in operative position.

11. The combination with a fluid system including a pump, of adjustable control means for controlling the operation of said pump, a fluid motor for actuating said control means, a valve controlling the operation of said motor, operating mechanism for the valve, flexible means connecting the valve to its operating mechanism and permitting actuation of the valve independent of said mechanism, said flexible means comprising a coil spring mounted adjacent said valve, a pair of seats for said spring, and adjustable means for retaining at least one of said seats in operative position and means actuated by pressure in said system for actuating the valve independently of said first-named mechanism.

12. The combination with a fluid system including a pump, of adjustable control means for controlling the operation of said pump, a fluid motor for actuating said control means, a valve controlling the operation of said motor, operating mechanism for the valve, flexible means connecting the valve to its operating mechanism and permitting actuation of the valve independent of said mechanism, said flexible means including a coil spring mounted adjacent said valve, a pair of seats for said spring, and means for retaining said seats in operative position and means automatically operative when the pressure in said system reaches a predetermined maximum for actuating the valve independent of said mechanism.

13. The combination with a fluid system including a hydraulic motor and a pump for actuating said motor, of adjustable control means for controlling the operation of said pump, a hydraulic motor for actuating said control means, a valve for controlling the operation of the said pump control motor, a differential mechanism operatively connected to the valve permitting actuation of the valve from a plurality of independent sources, one of said sources being constituted by a follow-up actuated by the first-named motor and the other including a manually-actuated element, and means for connecting said element to the differential including an electric generator mechanically connected to said element and a synchronous motor mechanically connected to said differential, and an electrical system connecting said generator and synchronous motor.

14. In a steering apparatus, the combination with a fluid system including a fluid motor, and a pump for supplying actuating fluid thereto, means for controlling the flow of fluid in said system including an adjustable member, a second fluid motor for actuating said member, a valve controlling the operation of said second motor, means whereby actuation of said second motor resulting from an adjustment of said valve effects an automatic reclosing of said valve to interrupt the operation of said second motor, followup means actuated by said motor first named for actuating said valve toward normal position to effect a corresponding movement toward normal position of said discharge controlling means to reduce the discharge of said pump when the first mentioned motor has been actuated the desired amount, and means automatically operative when the pressure in said system reaches a predetermined maximum for adjusting the valve into a position effecting an operation of said member to interrupt the discharge of the fluid from the pump to the system.

15. In a device of the class described, the combination of a fluid motor, a variable stroke reversible discharge pump for actuating said motor, adjustable control means for said pump, an hydraulic cylinder, a plunger operative in said cylinder, and connected to said adjustable control means, a valve controlling the operation of said plunger, means for actuating said valve including a differential mechanism, flexible means for connecting said valve to said differential mechanism, manually actuated valve operating means connected to one side of said differential, and a followup mechanism operatively connecting said fluid motor to the other side of said differential.

16. In a device of the class described, the combination of a fluid motor, a variable stroke reversible discharge pump for actuating said motor, adjustable control means for said pump, an hydraulic cylinder, a plunger operative in said cylinder, and connected to said adjustable control means, a valve controlling the operation of said plunger, means for actuating said valve including a differential mechanism, manually actuated valve operating means connected to one side of said differential, a followup mechanism operatively connecting said fluid motor to the other side of said differential, and means independent of said differential for actuating said valve to neutral position when the pressure of the fluid delivered by said pump exceeds a predetermined value.

17. In a device of the class described, the combination with a fluid motor, a variable stroke reversible discharge pump for actuating said motor, adjustable control means for said pump, an hydraulic cylinder, a plunger operative in said cylinder and connected to said pump control means, a valve controlling the operation of said plunger, means whereby adjustment of said valve effects a predetermined movement of the plunger, and a subsequent interruption in the flow of actuated fluid to the cylinder, means for actuating said valve including a differential mechanism, manually actuated means connected to one side of said differential and a follow-up mechanism operatively connecting the said motor to the other side of said differential, said follow-up being effective to return the valve to a position from which it is adjusted by said manual means, and means independent of said differential for actuating said valve to normal position when the fluid pressure delivered by said pump exceeds a predetermined value.

18. In a device of the class described, the combination with an hydraulic motor, a pump for actuating said motor, of adjustable control means for controlling the operation of said pump, an hydraulic motor for actuating said control means, a valve for controlling the operation of said pump control motor, a differential mechanism operatively connected to the valve permitting actuation of the valve from a plurality of independent sources, one of said sources being constituted by a follow-up actuated by the first mentioned motor, and the other including a manually actuated element, means for connecting said element to the differential including an electric generator mechanically connected to said element, and a synchronous motor mechanically connected to said differential, an electrical system connecting said generator and motor, and means independent of said follow-up and manually actuated element for actuating said valve to normal position when the fluid pressure delivered by said pump exceeds a predetermined value.

19. In a device of the class described, the combination with a fluid motor, of a variable stroke reversible discharge pump for actuating said motor, adjustable control means for said pump, an hydraulic cylinder, a plunger operative in said cylinder and connected to said adjustable control means, a valve controlling the operation of said plunger, means for actuating said valve including the differential mechanism, manually actuated valve operating means connected to one side of said differential, and a follow-up mechanism operatively connecting said fluid motor to the other side of said differential, resilient means connecting said valve to said differential, and means independent of said manual actuating mechanism and follow-up mechanism for actuating said valve against the tension of said resilient means.

20. In a device of the class described, the combination with a fluid motor, of a variable stroke reversible discharge pump for actuating said motor, adjustable control means for said pump, an hydraulic cylinder, a plunger operative in said cylinder and connected to said pump control means, a valve controlling the operation of said plunger, means for actuating the valve including a differential mechanism, manually actuated valve operating means connected to one side of said differential, a follow-up operatively connecting said motor to the other side of said differential, resilient means connecting said valve to said differential mechanism, and fluid pressure means for actuating said valve to normal position independent of said differential mechanism when the fluid pressure delivered by said pump exceeds a predetermined value.

21. In a device of the class described, the combination with a fluid motor, of a variable stroke reversible discharge pump for actuating said motor, adjustable control means for said pump, an hydraulic cylinder, a plunger operative in said cylinder and connected to said pump control means, a valve controlling the operation of said plunger, means for actuating the valve including a differential mechanism, manually actuated valve operating means connected to one side of said differential, and a follow-up operatively connecting said motor to the other side of said differential, resilient means connecting said valve to said differential mechanism, said resilient means comprising a coil spring mounted adjacent to said valve, seats for said spring, means for retaining said seats in operative position, a crosshead mounted adjacent said valve and engaging one of said spring seats, and means for adjusting said valve toward normal position independent of said differential mechanism when the pressure delivered by said pump exceeds a predetermined value.

ROBERT C. LAMOND.